No. 782,712. PATENTED FEB. 14, 1905.
J. F. WILDGEN.
CURTAIN FASTENER.
APPLICATION FILED AUG. 22, 1904.

ATTEST
A. J. McCauley
Alfred Hicks

INVENTOR:—
John F. Wildgen,
BY Higdon & Longan & Hopkins,
ATTYS.

No. 782,712.

Patented February 14, 1905.

UNITED STATES PATENT OFFICE.

JOHN F. WILDGEN, OF ST. LOUIS, MISSOURI.

CURTAIN-FASTENER.

SPECIFICATION forming part of Letters Patent No. 782,712, dated February 14, 1905.

Application filed August 22, 1904. Serial No. 221,735.

*To all whom it may concern:*

Be it known that I, JOHN F. WILDGEN, a citizen of the United States, and a resident of St. Louis, Missouri, have invented certain new and useful Improvements in Curtain-Fasteners, of which the following is a specification containing a full, clear, and exact description, reference being had to the accompanying drawings, forming a part hereof.

My invention relates to improvements in curtain-fasteners; and it consists of the novel features herein shown, described, and claimed.

Figure 1:
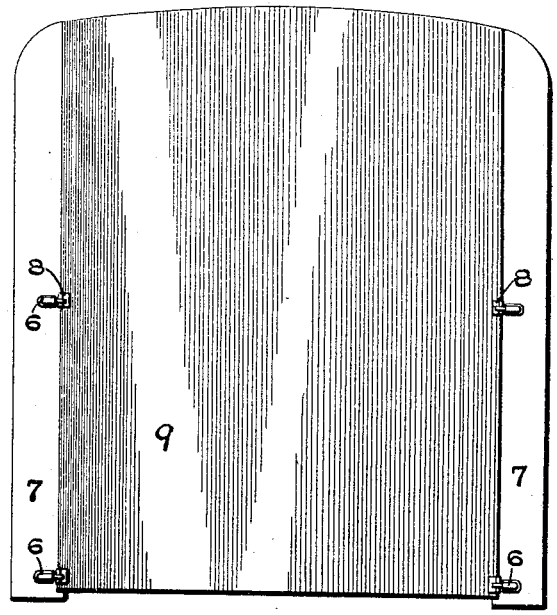
Figure 2:
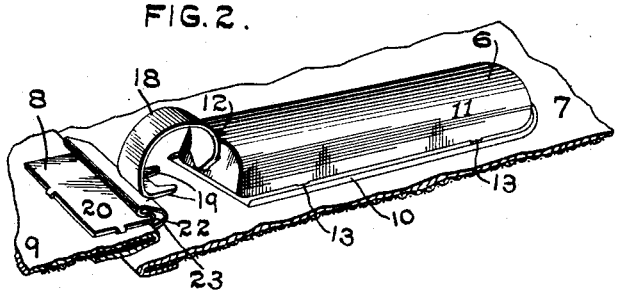
Figure 3:
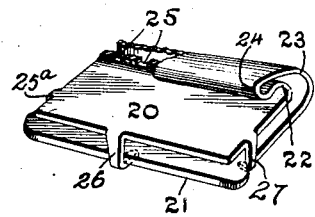
Figure 4:
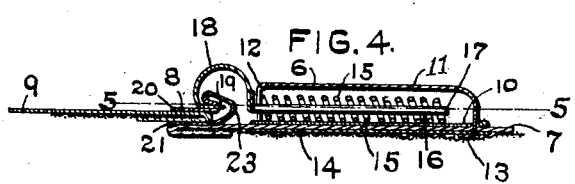
Figure 5:
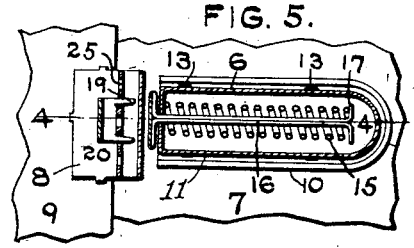

In the drawings, Figure 1 is an elevation showing my improved curtain-fastener in use. Fig. 2 is a perspective, upon an enlarged scale, illustrating the operation of the curtain-fastener, the curtain being broken away to economize space. Fig. 3 is a detail perspective of the eye member of the curtain-fastener. Fig. 4 is a vertical longitudinal section of the curtain-fastener in position for use and taken on the line 4 4 of Fig. 5. Fig. 5 is a horizontal section on the line 5 5 of Fig. 4.

Referring to the drawings in detail, the hook member 6 is attached to the curtain-seat 7, and the eye member 8 is attached to the edge of the curtain 9. The hook member comprises the base-plate 10, adapted to engage the outer face of the curtain-seat 7; the spring-housing 11, stamped and pressed out of sheet metal, said housing being semicircular in cross-section and having closed ends, there being a bearing 12 in the forward end; teeth 13, extending downwardly from the edge of the housing; the attaching-plate 14, adapted to engage below the curtain-seat 7, said teeth 13 extending through the attaching-plate and being clenched; the expansive coil-spring 15 in the housing; the bar 16, extending through the bearing 12 and through the spring 15; the spring-seat 17 upon the inner end of the bar against the inner end of the spring, and the hook 18, extending from the forward end of the bar upwardly in the form of a semicircle and having teeth 19 extending backwardly from its forward end, said teeth being substantially in a horizontal plane. The curtain-seat is of ordinary enameled finish on a cloth base. The curtain-seat 7 is attached to the supporting-frame (not shown) and forms the base to which the curtain is applied and upon which the curtain is supported. The bar 16, the spring-seat 17, the hook 18, and the teeth 19 are formed integral of a single piece of sheet metal, the metal being folded upon itself to form the bar 16 and the rear end of the bar being bifurcated to form the spring-seat 17. The eye member comprises the upper attaching-plate 20; the lower attaching-plate 21; the hook-shaped portion 22, extending from the plate 20; the hook-shaped portion 23, extending from the plate 21; the semicircular bearing portion 24, connecting the hook-shaped portions 22 and 23 together, there being eye-openings 25 through the hook-shaped portion 22 to receive the teeth 19, and attaching-teeth $25^a$, 26, and 27, extending from the free edges of the plate 20 through the curtain 9 and clenched around the edges of the plate 21. The bearing portion 24 is of considerable length, and there are several of the eye-openings 25, so that the eye member may be adjusted up and down relative to the hook member as required to allow for the shrinking and expanding of the curtain and allow for the inaccuracies of construction. By this means it is possible to pull the curtain down until it is smooth and then connect the eye to the hook and hold the curtain smooth, whereas in the old construction a single button engaged a single eye and there was no provision for adjustment.

The eye member may be made any desired length to provide for any amount of adjustment.

I claim—

1. In a curtain-fastener: a hook member, and an eye member adapted to be engaged by the hook member; said hook member comprising the base-plate 10; the spring-housing 11 of sheet metal; said housing being semicircular in cross-section and having closed ends and there being a bearing in its forward end; the teeth 13 extending downwardly from the edge of the housing through an attaching-plate; the expansive coil-spring 15 in the housing; the bar 16 extending through the bearing and through the spring; the spring-seat 17 upon the inner end of the bearing against the inner end of the spring; the hook 18 extending from the forward end of the bar in the form of a semicircle, and having teeth extending backwardly from its forward end to engage the eye member; substantially as specified.

2. In a curtain-fastener: a hook member, and an eye member adapted to be engaged by the hook member; said hook member comprising a base-plate adapted to engage the outer face of the curtain-seat; an attaching-plate adapted to engage the inner face of the curtain-seat; a spring-housing of sheet metal; said housing being semicircular in cross-section and having closed ends; and there being a bearing in the forward end; teeth extending downwardly from the edge of the housing through the base-plate and through the attaching-plate; an expansive coil-spring in the housing; a bar extending through the bearing in the end of the housing and through the spring; a spring-seat upon the inner end of the bar against the inner end of the spring; and a hook extending from the forward end of the bar in the form of a semicircle and having teeth extending backwardly to engage the eye member; substantially as specified.

3. In a curtain-fastener: a hook member having teeth, and an eye member adapted to be engaged by the hook member; said eye member comprising an upper attaching-plate; a lower attaching-plate; the hook-shaped portion extending from the upper plate; a hook-shaped portion extending from the lower plate; a semicircular bearing portion connecting the two hook-shaped portions together; there being a plurality of eye-openings through the first hook-shaped portion to receive the teeth of the hook member, so that one member may be adjusted relative to the other; substantially as specified.

In testimony whereof I have signed my name to this specification in presence of two subscribing witnesses.

JOHN F. WILDGEN.

Witnesses:
 ALFRED A. EICKS,
 M. M. BRAZILL.